(12) United States Patent
Kojima et al.

(10) Patent No.: US 8,517,527 B2
(45) Date of Patent: Aug. 27, 2013

(54) INKJET RECORDING INKSET AND INKJET RECORDING METHOD

(75) Inventors: Mariko Kojima, Tokyo (JP); Akihiko Gotoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 212 days.

(21) Appl. No.: 13/119,449

(22) PCT Filed: Sep. 15, 2009

(86) PCT No.: PCT/JP2009/066582
§ 371 (c)(1),
(2), (4) Date: Mar. 17, 2011

(87) PCT Pub. No.: WO2010/032867
PCT Pub. Date: Mar. 25, 2010

(65) Prior Publication Data
US 2011/0169889 A1 Jul. 14, 2011

(30) Foreign Application Priority Data

Sep. 17, 2008 (JP) .................................. 2008-238447

(51) Int. Cl.
*B41J 2/015* (2006.01)
*G01D 11/00* (2006.01)
(52) U.S. Cl.
USPC ............................................ 347/100; 347/20
(58) Field of Classification Search
USPC ................................................. 347/20, 100
See application file for complete search history.

(56) References Cited

U.S. PATENT DOCUMENTS
7,284,851 B2 10/2007 Bannai et al.
7,682,011 B2 3/2010 Namba et al.
(Continued)

FOREIGN PATENT DOCUMENTS
CN 101048469 A 10/2007
JP 2000 037890 2/2000
(Continued)

OTHER PUBLICATIONS

Extended European Search Report issued Jul. 25, 2011, in Patent Application No. 09814710.1.

(Continued)

*Primary Examiner* — Jason Uhlenhake
(74) *Attorney, Agent, or Firm* — Oblon, Spivak, McClelland, Maier & Neustadt, L.L.P.

(57) ABSTRACT

The present invention provides an inkjet recording inkset including a black ink; and at least one color ink, wherein the black ink and the color ink respectively contains a coloring material, water, a water-soluble organic solvent and a surfactant, and wherein the black ink contains, as the coloring material, a water-dispersible carbon black having a hydrophilic group on its surface, which can be dispersed without using a dispersing agent, and only the color ink contains, as the surfactant, a fluorine surfactant expressed by Chemical Formula 1: Chemical Formula 1 where Rf represents a fluorine-containing alkyl group; R1 represents an anionic group; R2 represents a cationic group; and q represents a positive integer.

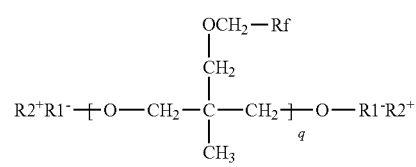

14 Claims, 1 Drawing Sheet

(56) References Cited

U.S. PATENT DOCUMENTS

| | | |
|---|---|---|
| 7,810,919 B2 | 10/2010 | Kojima et al. |
| 2001/0029273 A1 | 10/2001 | Taniguchi et al. |
| 2003/0130377 A1 | 7/2003 | Taniguchi et al. |
| 2006/0176349 A1 | 8/2006 | Nagai et al. |
| 2008/0070008 A1 | 3/2008 | Namba et al. |
| 2008/0254228 A1 | 10/2008 | Kojima et al. |
| 2009/0186162 A1 | 7/2009 | Namba et al. |
| 2009/0239044 A1 | 9/2009 | Habashi et al. |
| 2009/0258196 A1 | 10/2009 | Nagashima et al. |
| 2009/0263632 A1 | 10/2009 | Kojima et al. |

FOREIGN PATENT DOCUMENTS

| | | |
|---|---|---|
| JP | 3204761 | 6/2001 |
| JP | 2001 192583 | 7/2001 |
| JP | 3320292 | 6/2002 |
| JP | 2006 083243 | 3/2006 |
| JP | 2006 316243 | 11/2006 |
| JP | 2007 106997 | 4/2007 |
| JP | 3952794 | 5/2007 |
| JP | 2007 146135 | 6/2007 |
| JP | 3993022 | 8/2007 |
| JP | 4018241 | 9/2007 |
| WO | WO 2007/049782 A1 | 5/2007 |
| WO | WO 2007/100121 A1 | 9/2007 |
| WO | WO 2008/032628 A1 | 3/2008 |

OTHER PUBLICATIONS

International Search Report issued Dec. 28, 2009 in PCT/JP09/066582 filed Sep. 15, 2009.

Office Action issued Jan. 4, 2013 in Chinese Application No. 200980135992.6 (With English Translation).

INKJET RECORDING INKSET AND INKJET RECORDING METHOD

TECHNICAL FIELD

The present invention relates to an inkjet recording inkset and an inkjet recording method using the inkset.

BACKGROUND ART

The inkjet recording system has an advantage over an electrophotographic system in terms that the price of main body is held down and that printing cost can be held down because of low power consumption. Thus, the inkjet recording system is widespread for personal use and office use. An aqueous ink is a mainstream ink in terms of safety and environment-friendliness, and the ink containing a coloring material, water, and a water-soluble solvent is mainly used. However, an image printed by the inkjet recording system using such ink tends to bleed on plain paper, compared to an image printed by the electrophotographic system. Therefore, image enhancement has been a problem for the purpose of achieving a superior image quality.

When recording is performed by scanning with an ink ejection head in the inkjet recording system, the inkjet recording system is inferior in the recording speed to the electrophotographic system. Thus, in order to increase the recording speed, various methods are implemented; for example, the number of ejection nozzles are increased, or recording is performed in both an outward direction and an inward direction of scanning (bidirectional printing) so as to reduce the number of scanning.

However, image density may be seriously decreased due to the order of superimposing the ink colors. For example, the case where at first a black ink droplet is attached onto a medium and then a color ink droplet is attached thereon (for example, in an outward direction), and the case where at first a color ink droplet is attached onto a medium and then a black ink droplet is attached thereon (for example, in an inward direction) are compared, density is seriously decreased in the latter. As shown in FIG. 1B, it is considered that this phenomenon occurs because an ink droplet attached onto paper at first ($\alpha$) remains near a paper surface, and an ink droplet attached thereon later ($\beta$) penetrates into the paper.

This phenomenon causes difference in image density between the outward direction and the inward direction in bidirectional printing. As an effective means for preventing occurrence of difference in image density between the outward direction and the inward direction due to the change of the ejection order in the case where a black image is formed by mixing a color ink droplet and a black ink droplet, when firstly the color ink droplet is attached onto a medium, the black ink droplet is formed into aggregation on a surface of the medium so as to prevent the black ink droplet attached thereon later from penetrating into the medium.

An invention of Patent Literature 1 discloses that when a black image is formed, a color ink is ejected on a printing portion of black ink, namely, any one of cationic inks of cyan, magenta and yellow is superimposed on an anionic black ink, so that a coloring material of the black ink is insolubilized, thereby increasing image density. However, this method limits nozzle arrangement depending on the color of the cationic ink.

An invention of Patent Literature 2 discloses a method of forming a black image by superimposing an anionic black ink and a cationic light color ink. However, in this method, another head for the light color ink needs to be arranged. Thus, an apparatus is enlarged, and the number of cartridge is increased, raising cost.

In this way, it has been proposed that a method of aggregating the black ink by taking advantage of difference in ionicity. However, an inkset, which does not cause difference in image density depending on the order of ink ejection, and is excellent in ejection stability and image quality, has not been achieved at present.

On the other hand, Patent Literature 3 discloses an inkset consisting of a black ink and color inks of cyan, magenta and yellow, which including the same surfactant as that used in the present invention. However, decrease of color difference in bidirectional printing, which is the problem of the present invention, and means for solving the problem is not disclosed nor suggested. This is also apparent from claim 5, in which the same types of surfactants are used in the black ink and the color inks, which is not the case of the present invention.

CITATION LIST

Patent Literature

PTL 1 Japanese Patent (JP-B) No. 3320292
PTL 2 JP-B No. 3204761
PTL 3 Japanese Patent Application Laid-Open (JP-A) No. 2007-146135

SUMMARY OF INVENTION

An object of the present invention is to provide an inkjet recording inkset which enables to print with less color difference in bidirectional printing and with high image density in a printing method for forming a black image by superimposing a color ink droplet and a black ink droplet, and an inkjet recording method using the inkjet recording inkset.

Solution to Problem

Means for solving the problems are as follows.
<1> An inkjet recording inkset including a black ink and at least one color ink, wherein the black ink and the color ink respectively contains a coloring material, water, a water-soluble organic solvent and a surfactant, and wherein the black ink contains, as the coloring material, a water-dispersible carbon black having a hydrophilic group on its surface, which can be dispersed without using a dispersing agent, and only the color ink contains, as the surfactant, a fluorine surfactant expressed by Chemical Formula 1:

Chemical Formula 1

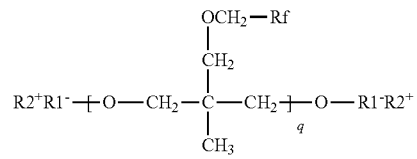

where Rf represents a fluorine-containing alkyl group; R1 represents an anionic group; R2 represents a cationic group; and q represents a positive integer.

<2> The inkjet recording inkset according to <1>, wherein the Rf in Chemical Formula 1 has 3 or less carbon atoms.

<3> The inkjet recording inkset according to <2>, wherein the Rf in Chemical Formula 1 is any one of $-CF_3$, $-CF_2CF_3$, and $-C_3F_7$.

<4> The inkjet recording inkset according to any one of <1> to <3>, wherein the R1 in Chemical Formula 1 is any one of $-SO_3$ and $-PO_3$.

<5> The inkjet recording inkset according to any one of <1> to <4>, wherein R2 in Chemical Formula 1 is any one of $-NH_4$, Na, K and Li.

<6> The inkjet recording inkset according to any one of <1> to <5>, wherein the q in Chemical Formula 1 is 1 to 6.

<7> The inkjet recording inkset according to any one of <1> to <6>, wherein the color ink contains a pigment as the coloring material.

<8> The inkjet recording inkset according to <7>, wherein the pigment contained in the color ink is dispersed by a compound expressed by Chemical Formula 4:

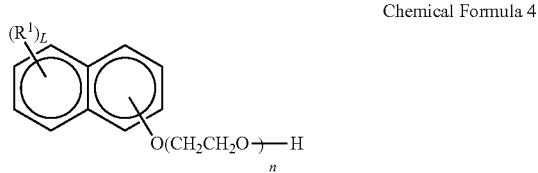

Chemical Formula 4 where $R^1$ represents any one of an alkyl group having 1 to 20 carbon atoms, an allyl group, and an aralkyl group; L represents an integer of 0 to 7; and n represents an integer of 20 to 200.

<9> The inkjet recording inkset according to <8>, wherein the n in Chemical Formula 4 represents an integer of 30 to 50.

<10> The inkjet recording inkset according to any one of <1> to <9>, wherein only the black ink contains, as the surfactant, a fluorine surfactant expressed by Chemical Formula 2:

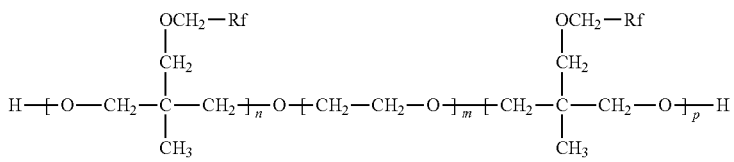

Chemical Formula 2 where Rf represents a fluorine-containing alkyl group; n, m, and p represents an integer of 0 or more.

<11> The inkjet recording inkset according to <10>, wherein the Rf in Chemical Formula 2 has 3 or less carbon atoms.

<12> The inkjet recording inkset according to <11>, wherein the Rf in Chemical Formula 2 represents any one of $-CF_3$, $-CF_2CF_3$, and $-C_3F_7$.

<13> The inkjet recording inkset according to any one of <10> to <12>, wherein the n, m and p in Chemical Formula 2 respectively represent 0 to 4, 0 to 20, and 0 to 4.

<14> The inkjet recording inkset according to any one of <1> to <13>, wherein the black ink further contains a resin emulsion.

<15> An inkjet recording method including superimposing a black ink droplet and at least one color ink droplet so as to form a black image in bidirectional printing by the use of an inkjet recording apparatus having two or more ink ejection heads, wherein the inkjet recording inkset according to any one of <1> to <14> is used.

DESCRIPTION OF EMBODIMENTS

Figure 1A:
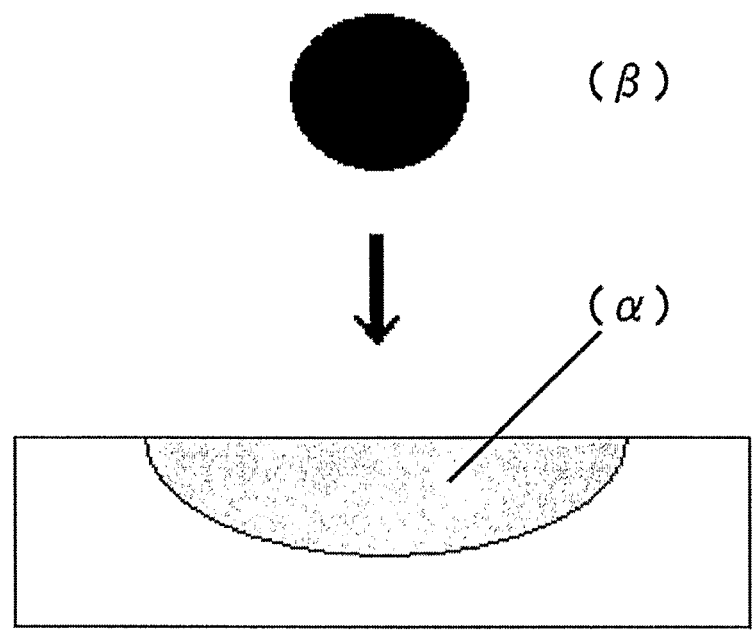
FIG. 1A shows an aspect of an ink droplet attached onto paper at first in a state where the ink droplet attached onto the paper at first remains near a surface of the paper and an ink droplet attached thereon later penetrates into the paper.
Figure 1B:
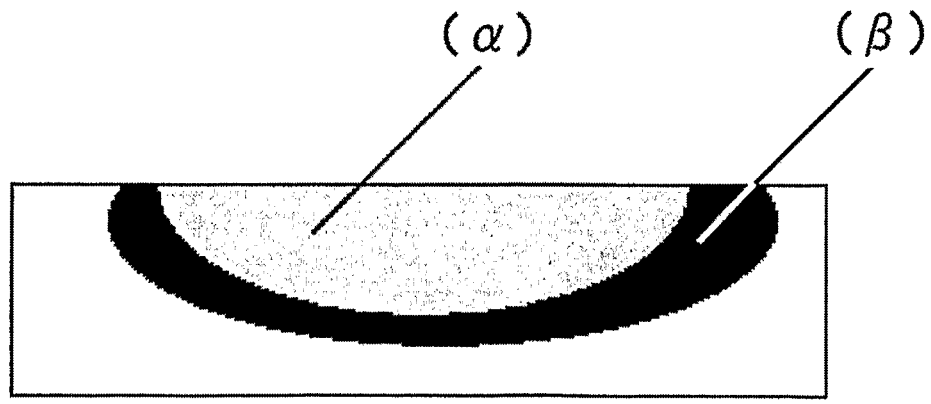
FIG. 1B shows an aspect of an ink droplet attached onto paper later penetrating into the paper in a state where an ink droplet attached onto the paper at first remains near a surface of the paper and the ink droplet attached thereon later penetrates into the paper.

Hereinafter, the present invention will be specifically explained.

As a surfactant which can be used for an inkjet recording inkset of the present invention, anionic surfactants, cationic surfactants, nonionic surfactants, amphoteric surfactants, fluorine surfactants or the like are exemplified. In the present invention, a fluorine surfactant expressed by Chemical Formula 1 is contained only in a color ink.

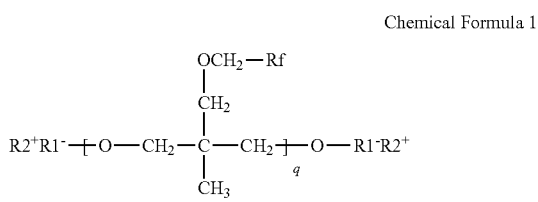

Chemical Formula 1

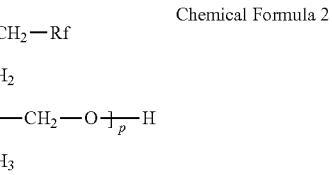

In Chemical Formula 1, Rf represents a fluorine-containing alkyl group which preferably has 3 or less carbon atoms, such as $-CF_3$, $-CF_2CF_3$, or $-C_3F_7$. R1 represents an anionic group, such as $-SO_3$ and $-PO_3$. R2 represents a cationic group, such as $-NH_4$, Na, K and Li. "q" is preferably 1 to 6.

Examples of the commercially available products of such fluorine surfactant include PF-136A (Rf=$CF_3$, q=up to 6), and PF-156A (Rf=$CF_2CF_3$, q=up to 6) (manufactured by Omnova Solutions Inc.).

Moreover, a fluorine surfactant expressed by Chemical Formula 2 is preferably contained only in a black ink.

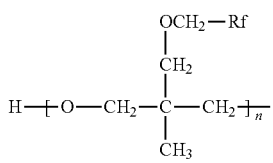 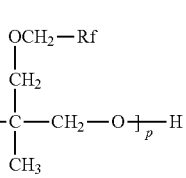

Chemical Formula 2

In Chemical Formula 2, Rf represents a fluorine-containing alkyl group which preferably has 3 or less carbon atoms, such as —$CF_3$, —$CF_2CF_3$ or —$C_3F_7$. "n", "m", "p" are preferably as follows: n=0 to 4, m=0 to 20, and p=0 to 4.

Examples of the commercially available products of such fluorine surfactant include PF-151N(Rf=$CF_2CF_3$, n=0 to 4, m=0 to 20, p=0 to 4) (manufactured by Omnova Solutions Inc.).

The fluorine surfactant can decrease a surface tension of the ink by addition of a small amount thereof. When the fluorine surfactant is added to an ink, the ink exhibits excellent wetting property and permeability with respect to a medium. The fluorine surfactant expressed by Chemical Formulas 1 and 2, where Rf has 3 or less carbon atoms, has low foaming property, and it is advantageous that an ink less foams upon filling a cartridge or in a printer when the fluorine surfactant is used in the ink.

On the other hand, in a production process of conventionally used fluorine surfactants, perfluorooctane sulfonate (PFOS) or perfluorooctanoate (PFOA) is generated, which is harmful as pointing out by Environmental Protection Agency (EPA), that "a compound having more than 4 carbon atoms, which is bonded with fluorine, may be accumulated in a human body". However, in the fluorine surfactant expressed by Chemical Formula 1 or 2, when Rf has 3 or less carbon atoms, the fluorine surfactant has a short fluorocarbon chain and a large molecular weight of a main chain, so that it is not accumulated in a human body, and is highly safe. Thus, the fluorine surfactant in which Rf has 3 or less carbon atoms is preferably used in terms of safety.

In the inkset of the present invention, the fluorine surfactant expressed by Chemical Formula 1 is used only in the color ink, because the fluorine surfactant is poorly compatible with a water-dispersible carbon black having a hydrophilic group on its surface which can be dispersed without using a dispersing agent (self-dispersible carbon clack), causing aggregation and increase in viscosity under the strict condition i.e. "stored at 65° C. for 1 month" as in Examples described later.

On the other hand, the fluorine surfactant expressed by Chemical Formula 2 used with the carbon black dispersion may not cause aggregation and increase in viscosity.

Then, when a black ink droplet is attached on a color droplet used in the present invention, which has been attached onto paper, the water and the solvent are evaporated or penetrated, but the fluorine surfactant expressed by Chemical Formula 1 remains with a solid content of the coloring material along paper fibers, thereby aggregating carbon black. This prevents penetration of the coloring material into the paper, and decrease of image density.

The amount of the fluorine surfactant expressed by Chemical Formula 1 in the color ink is, on mass basis, expressed in a ratio of the fluorine surfactant to the coloring material of the color ink, and the ratio is preferably 0.1:1 to 2.0:1, and more preferably 0.1:1 to 1.0:1. Within this range, an ink having a small average particle diameter can be provided. When the ratio of the fluorine surfactant is less than 0.1, the coloring material may be insufficiently dispersed. When the ratio of the fluorine surfactant is more than 2.0, an ink has excessively high viscosity, and recording by the inkjet system may be difficult.

The black ink may contain a fluorine surfactant other than those expressed by Chemical Formula 2; for example, a fluorine surfactant expressed by Chemical Formula 3 (Zonyl FSO, manufactured by DuPont) may be contained in the black ink.

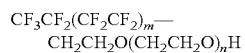

Chemical Formula 3 where, m is an integer of 0 to 10, n is an integer of 1 to 40.

The fluorine surfactants may include commercially available products, for example, SURFLON S-111, S-112, S-113, S-121, S-131, S-132, S-141 and S-145 (all of which are manufactured by Asahi Glass Co., Ltd.); FLUORAD FC-93, FC-95, FC-98, FC-129, FC-135, FC-170C, FC-430, FC-431 and FC-4430 (all of which are manufactured by Sumitomo 3M Limited); MEGAFAC F-470, F-1405 and F-474 (all of which are manufactured by Dainippon Ink and Chemicals Incorporated); Zonyl FS-300, FSN, FSN-100 and FSO (all of which are manufactured by Dupont Inc.); EFTOP EF-351, 352, 801 and 802 (all of which are manufactured by Jemco Inc.).

The following examples may also be used other than the fluorine surfactants used in black ink:

The anionic surfactants include, for example, alkylallyl sulfonate, alkylnaphthalene sulfonate, alkyl phosphate, alkyl sulfate, alkyl sulfonate, alkylether sulfate, alkyl sulfosuccinate, alkylester sulfate, alkylbenzene sulfonate, alkyldiphenyl ether disulfonate, alkylaryl ether phosphate, alkylaryl ether sulfate, alkylaryl etherester sulfate, olefin sulfonate, alkane olefin sulfonate, polyoxyethylene alkylether phosphate, polyoxyethylene alkylether sulfate, ether carboxylate, sulfosuccinate, α-sulfo fatty acid ester, fatty acid salt, condensate of fatty acid with amino acid, and naphthenic acid salt.

The cationic surfactants include, for example, alkyl amine salts, dialkyl amine salts, aliphatic amine salts, benzalkonium salts, quaternary ammonium salts, alkylpyridinium salts, imidazorinium salts, sulfonium salts and phosphonium salts.

The nonionic surfactants include, for example, an acetylene glycol surfactant, polyoxyethylene alkylether, polyoxyethylene alkylphenyl ether, polyoxyethylene alkyl ester, polyoxyethylene sorbitan fatty acid ester.

The amphoteric surfactants include, for example, imidazoline derivatives such as imidazorinium betaine; dimethylalkyl lauryl betaine, alkylglycine and alkyldi(aminoethyl)glycine.

The inkset of the present invention includes a water-dispersible carbon black having a hydrophilic group on its surface which can be dispersed without using a dispersing agent as the coloring material of the black ink. The carbon black preferably has a primary particle diameter of 15 nm to 40 nm, a BET specific surface area of 50 $m^2$/g to 300 $m^2$/g, a DBP oil absorption of 40 mL/100 g to 150 mL/100 g, and a pH value of 2 to 9. Such carbon black can be produced by a channel method, an oil furnace method, a furnace method, an acetylene black method, a thermal black method or the like.

Specific examples of the carbon black include #2700, #2650, #2600, #2450B, #2400B, #2350, #230, #1000, #990, #980, #970, #960, #950, #900, #850, #750B, MCF 88, #650B, MA 600, MA 77, MA 7, MA 8, MA 11, MA 100, MA 100R, MA 100S, MA 220, MA 230, MA 200RB, MA 14, #52, #50, #47, #45, #45L, #44, #40, #33, #32, #30, #25, #20, #10, #5, #95, #85, CF 9, and #260 (all of which are manufactured by Mitsubishi Chemical Corporation); Raven 700, 5750, 5250, 5000, 3500 and 1255 (all of which are manufactured by Colombia Corporation); Regal 400R, 330R, 660R, MogulL, Monarch 700, 800, 880, 900, 1000, 1100, 1300, and 1400 (all of which are manufactured by Cabot Corporation); Color Black FW1, FW2, FW2V, FW18, FW200, S150, S160, S170, Printex 35, U, V, 140U, 140V, Special Black 6, 5, 4A and 4 (all of which are manufactured by Degussa AG); Toka Black #8500, #8300, #7550, #7400, #7360, #7350, #7270 and #7100 (all of which are manufactured by Tokai Carbon Co., Ltd.); Fat-soluble (Shiyou) Black N110, N220, N234, N339, N330, N326, N330T, MAF and N550, (all of which are manufactured by Cabot Japan K.K.).

Examples of the method for modifying a surface of the carbon black so as to have a hydrophilic group which enables the carbon black to be dispersed in water without using a dispersing agent, include a method in which a carbon black is added to an aqueous solution of oxidizing agent, for example, an aqueous solution of an alkali-metal salt such as hypochlorite, chlorite, chlorate, persulfate, perborate, and percarbonate; or an ammonium salt to thereby subject the carbon black to an oxidization treatment; a method of subjecting a carbon black to an oxidizing plasma treatment at low-temperature; and a method of oxidizing a carbon black using ozone.

Examples of the hydrophilic group includes —COOM, —SO₃M, —PO₃HM, —PO₃M₂, —SO₂NH₂ and —SO₂NHCOR (in the formula, M denotes a hydrogen atom, alkali metal, ammonium or organic ammonium, and R denotes an alkyl group having 1 to 12 carbon atoms, a phenyl group which may have a substituent group or a naphthyl group which may have a substituent group.). In particular preferable are those in which —COOM or —SO₃M is bonded on the surface. Examples of the alkali metal which is represented by M in the hydrophilic group include lithium, sodium, and potassium. Examples of the organic ammonium include mono-, di-, tri-methyl ammonium, mono-, di-, tri-ethyl ammonium, and mono-, di-, tri-methanol ammonium.

In addition, it is possible to bind N-ethylpyridyl group with a carbon black by subjecting the carbon black to a treatment using 3-amino-N-ethylpyridium bromide, and it is also possible to introduce a cationic hydrophilic group into a carbon black by reacting diazonium salt to the carbon black. As the cationic hydrophilic group, quaternary ammonium groups described below are preferably used. A carbon black pigment of which any one of these quaternary ammonium groups is bound to the surface is suitably used as a color material.

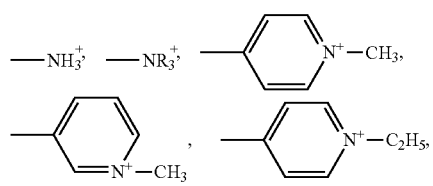

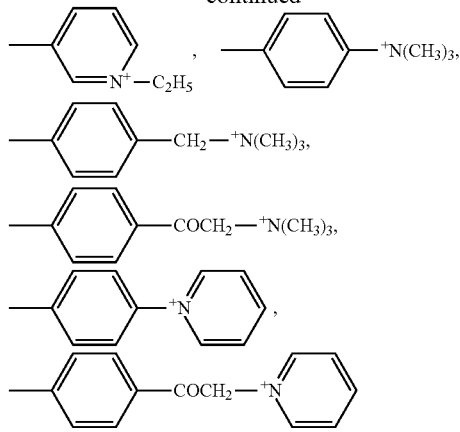

The water-soluble organic solvent used in the ink of the present invention is not particularly limited and may be suitably selected in accordance with the intended use. Examples thereof include polyvalent alcohols such as ethylene glycol, diethylene glycol, triethylene glycol, propylene glycol, dipropylene glycol, tripropylene glycol, 1,3-propane diol, 1,3-butane diol, 2,3-butane diol, 1,4 butane diol, 3-methyl-1,3-butane diol, 1,5-pentane diol, tetra-ethylene glycol, 1,6-hexane diol, 3-methyl-1,5-pentane diol, 2-methyl-2,4-pentane diol, polyethylene glycol, glycerol, 1,2,6-hexane triol, 1,2,4-butane triol, 1,2,3-butane triol and petriol; polyvalent alcohol alkyl ethers such as ethylene glycol monoethyl ether, ethylene glycol monobutyl ether, diethylene glycol monomethyl-ether, diethylene glycol monoethyl ether, diethylene glycol monobutyl ether, tetra-ethylene glycol monomethyl ether and propylene glycol monoethyl ether; polyvalent alcohol aryl ethers such as ethylene glycol monophenyl ether, and ethylene glycol monobenzyl ether; nitrogen-containing heterocycle compounds such as N-methyl-2-pyrolidone, N-hydroxy ethyl-2-pyrolidone, 2-pyrolidone, 1,3-dimethylimidazolidinone, ε-caprolactam; amides such as formamide, N-methyl formamide, and N,N-dimethyl formamide; amines such as monoethanol amine, diethanol amine, triethanol amine, monoethyl amine, diethyl amine and triethyl amine; sulfur-containing compounds such as dimethyl sulfoxide, sulfolane and thiodiethanol; propylene carbonate and ethylene carbonate.

These may be used solely or in combination.

Among these, in view of obtaining the solubility and excellent effects in preventing poor jetting properties due to water evaporation, in particular preferable are glycerin, ethylene glycol, diethylene glycol, triethylene glycol, propylene glycol, dipropylene glycol, tripropylene glycol, 1,3-butane diol, 2,3-butane diol, 1,4-butane diol, 3-methyl-1,3-butane diol, 1,5-pentane diol, tetra-ethylene glycol, 1,6-hexane diol, 3-methyl-1,5-pentane diol, 2-methyl-2,4-pentane diol, polyethylene glycol, 1,2,4-butane triol, 1,2,6-hexane triol, thiodiglycol, 2-pyrolidone, N-methyl-2-pyrolidone, and N-hydroxy ethyl-2-pyrolidone.

As described above, in general, when ink droplets are attached superimposingly onto a medium, the ink droplet attached later penetrates into the paper more deeply than the ink droplet attached beforehand. When a black ink droplet is attached on a color ink droplet, the black ink penetrates to the inside, decreasing image density. Therefore, it is necessary to maintain carbon black on a medium surface as much as possible, in order to prevent the density of a black image from decreasing. Moreover, when a black image is formed by mixing the black ink droplet with the color ink droplet in bidirectional printing, it is necessary to provide a means in which no difference in image density occurs between the case where at first the black ink droplet is attached on a medium and then the color ink droplet is attached thereon, and the case where at first the color ink droplet is attached onto the medium and then the black ink droplet is attached thereon. The inkset of the present invention can achieve to provide the above-described means.

The inkset of the present invention differs from the case of taking advantage of the difference in pH or ionicity, and ink droplets of the inkset of the present invention do not undergo aggregation upon contacting with each other, but after the ink droplets are attached onto a medium, water or a solvent is evaporated or penetrates into the medium to some extent, and then aggregation occurs under the condition that the concentration of the surfactant is partly increased. As the ink used in the inkset of the present invention does not undergo aggregation upon contacting with each other, the inks do not undergo aggregation even if they come into contact with each other in ink ejection heads which are adjacently arranged. Therefore, ejection failure may not occur due to the aggregation occurring in the heads.

Moreover, it is found that in the inkset of the present invention the fluorine surfactant expressed by Chemical Formula 2 is not compatible with the color ink, causing increase in viscosity and aggregation. Thus, when at first the black ink droplet is attached on a medium and then the color ink droplet is superimposed thereon, the penetration of the color ink into medium can be inhibited. That is, the inkset including the color ink containing the surfactant expressed by Chemical Formula 1, and the black ink containing the surfactant expressed by Chemical Formula 2 is used so as to decrease the difference in density in the bidirectional printing, thereby performing highly reliable printing (see Examples 2, 5 and 8).

The water-dispersible carbon black having a hydrophilic group on its surface which can be dispersed without using a dispersing agent is excellent in dispersibility and contributes to obtain high image density. Moreover, a resin may be further added in the ink so as to give the ink fixability on a medium. In the case where a water-insoluble resin is used in a dispersed state in water, upon evaporation of a solvent, the resins are fused to each other to form a film, thereby exhibiting an effect of fixing a coloring agent on a medium. Further, when the solvent is evaporated, the resin tends to increase in viscosity and undergo aggregation, inhibiting the penetration of components of coloring materials to provide a high image density. They are also effective in preventing strike through.

Examples of the resin components include acrylic resins, vinyl acetate resins, styrene-butadiene resins, vinylchloride resins, acryl-styrene resins, acrylic silicone resins, butadiene resins, styrene resins, urethane resins, and acrylic urethane resins.

The amount of the resin emulsion is preferably 0.1% by mass to 40% by mass, and more preferably 1% by mass to 25% by mass relative to the ink content. When the amount of the resin is less than 0.1% by mass, a sufficient fixability may not be obtained, and when the amount thereof is more than 40% by mass, there may be cases where the storage stability may be degraded because of the composition with high solids content and less solvent; and the ejecting property may be degraded because the resin particles are easily dried and solidified in the nozzle.

Examples of color pigments used in the color ink of the present invention include phthalocyanine blue, phthalocyanine green, quinacridone, anthraquinone, perylene, (thio)indigoid, heterocyclic yellow, and pyranthron.

Examples of the phthalocyanine blue include copper phthalocyanine blue and derivatives thereof (Pigment Blue 15).

Examples of the quinacridone include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42.

Examples of the anthraquinone include Pigment Red 43, Pigment Red 194 (perinone red), Pigment Red 216 (brominated pyranthron red) and Pigment Red 226 (pyranthron red).

Examples of the perylene include Pigment Red 123 (vermillion), Pigment Red 149 (scarlet), Pigment Red 179 (maroon), Pigment Red 190 (red), Pigment Violet, Pigment Red 189 (yellow shade red) and Pigment Red 224.

Examples of the thioindigoid include Pigment Red 86, Pigment Red 87, Pigment Red 88, Pigment Red 181, Pigment Red 198, Pigment Violet 36 and Pigment Violet 38.

Examples of the heterocyclic yellow include Pigment Yellow 117 and Pigment Yellow 138.

Other suitable examples of coloring pigments are described in "The Colour Index, third ed., The Society of Dyers and Colourists, 1982", for instance.

A method of dispersing these pigments in water using a dispersing agent is conventionally known.

Examples of the dispersing agents include polyacrylic acid, polymethacrylic acid, acrylic acid-acrylonitrile copolymers, vinyl acetate-acrylic acid ester copolymers, acrylic acid-acrylic acid alkyl ester copolymers, styrene-acrylic acid copolymers, styrene-methacrylic acid copolymers, styrene-acrylic acid-acrylic acid alkyl ester copolymers, styrene-methacrylic acid-acrylic acid alkyl ester copolymers, styrene-α-methylstyrene-acrylic acid copolymers, styrene-α-methylstyrene-acrylic acid copolymers-acrylic acid alkyl ester copolymers, styrene-maleic acid copolymers, vinylnaphthalene-maleic acid copolymers, vinyl acetate-ethylene copolymers, vinyl acetate-fatty acid vinyl ethylene copolymers, vinyl acetate-maleic acid ester copolymers, vinyl acetate-crotonic acid copolymers and vinyl acetate-acrylic acid copolymers.

The compound expressed by Chemical Formula 4 is preferably used as the pigment dispersing agent in the color ink used in the inkset of the present invention. A polyoxyethylene group is included as a hydrophilic group, so that charge on a pigment surface can be suitably maintained.

Chemical Formula 4

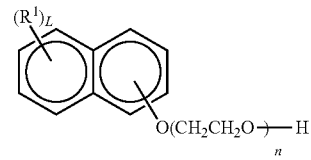

In the Chemical Formula 4, "n" is preferably 20 to 200, and more preferably 30 to 50.

When "n" is less than 20, dispersing stability tends to be poor, and the ink contains a pigment having a large average particle diameter, and thus the color saturation may not be satisfactorily obtained. When "n" is more than 200, the viscosity of the ink tends to be high, causing difficulty in performing recording by the inkjet system.

$R^1$ represents any one of an alkyl having 1 to 20 carbon atoms, an allyl group, and an aralkyl group.

Examples of the alkyl group having 1 to 20 carbon atoms represented by $R^1$ include a methyl group, an ethyl group, a propyl group, a butyl group, and an isopropyl group.

Examples of the allyl group represented by $R^1$ include 2-propenyl and 2-methyl-2-propenyl.

Examples of the aralkyl group represented by $R^1$ include benzyl, phenethyl, 2-methylbenzyl, 3-methylbenzyl and 4-methylbenzyl.

Specific examples of compounds expressed by Chemical Formula 4 include polyoxyethylene (n=20) β-naphthyl ether, polyoxyethylene (n=40) β-naphthyl ether and polyoxyethylene (n=60) β-naphthyl ether. Among these, polyoxyethylene (n=40) β-naphthyl ether is particularly preferable.

In the color ink used in the present invention, an aqueous dispersion of fine polymer particles containing the coloring material is preferably used. In the present specification, the expression "fine polymer particles contain a coloring material" means either or both of a state in which the coloring material is encapsulated in the fine polymer particles, and a state in which the coloring material is adsorbed on the surface of the fine polymer particles. In this case, it is not that all of the coloring material included in the ink of the present invention needs to be encapsulated in or adsorbed on the fine polymer particles but that the coloring material may be dispersed in the emulsion to such an extent that the effects of the present invention are not impaired. The coloring material is not particularly limited and may be suitably selected in accordance with the intended use, as long as it is insoluble or sparingly soluble in water and can be adsorbed by the polymer. In the present specification, the expression "insoluble or sparingly soluble in water" means that 10 parts by mass or more of the coloring material dissolves in 100 parts by mass of water at 20° C., whereas the term "dissolve" means that neither separation nor sedimentation of the coloring material is confirmed at the surface layer or bottom layer of the aqueous solution by visual observation.

The dynamic surface tension of each ink in the inkset of the present invention is measured by a maximum bubble pressure method at 25° C. and 100 ms is preferably 25 mN/m to 40 mN/m. The dynamic surface tension at a short time of less than 1 second is a parameter which represents a wetting property of an ink to a medium upon attaching the ink onto a medium. When the dynamic surface tension is more than 40 mN/m, the wetting property is not sufficient, adversely affecting drying property or image density. When the dynamic surface tension is less than 25 mN/m, the draining property of the ejection nozzle becomes poor, ejection stability may be decreased.

Each ink in the inkset of the present invention preferably has a viscosity at 25° C. of 6 mPa·s to 20 mPa·s, and more preferably 6 mPa·s to 15 mPa·s. The viscosity of more than 20 mPa·s may cause difficulty in securing the ejection stability.

The penetrating agent including a diol compound having 7 to 11 carbon atoms can be used in each ink in the inkset of the present invention. When the number of carbon atoms is less than 7, the diol compound cannot be sufficiently penetrated into a recording medium, the recording medium is contaminated at the time of duplex printing, and the pixel density is scarce due to insufficient ink-spreading on a recording medium, which may degrade character quality and image density. When the number of carbon atoms is more than 11, the storage stability may be degraded.

Examples of the diol compound include 2-ethyl-1,3-hexanediol, and 2,2,4-trimethyl-1,3-pentane diol.

The amount of the diol compound is preferably 0.1% by mass to 20% by mass, and more preferably 0.5% by mass to 10% by mass. When the amount of the diol compound is excessively small, the penetration property of the ink relative to paper may be degraded, resulting in contamination of the paper when the paper is conveyed and rubbed with a roller, or it may make the ink adhere on a conveying belt, resulting in contamination of a recording medium when the recorded surface of the recording medium is flipped for printing both sides of the recording medium. Therefore, it may not be able to effectively achieve high-speed printing and duplex printing.

When the added amount of the diol compound is excessively large, the printing dot diameter may be increased to broaden the character line width or to degrade the image sharpness.

The other components are not particularly limited and may be suitably selected in accordance with the intended use. Examples thereof include antiseptic/antifungal agents, pH adjustors, rust-preventing agents, antioxidants, ultraviolet absorbing agents, oxygen absorbents, and light stabilizers.

Examples of the antiseptic/antifungal agents include 1,2-benzoisothiazolin-3-on, sodium dehydroacetate, sodium sorbate, 2-pyridinethiol-1-sodium oxide, sodium benzoate and sodium pentachlorophenol.

The pH adjustors are not particularly limited as long as they do not affect ink to be formulated and is able to adjust pH to 7 or higher. Any given substance may be used in accordance with the intended use. Examples of the pH adjustors include amines such as diethanol amine and triethanol amine; hydroxides of alkali metal elements such as lithium hydroxide, sodium hydroxide and potassium hydroxide; carbonates of alkali metals such as ammonium hydroxide, quaternary ammonium hydroxide, quaternary phosphonium hydroxide, lithium carbonate, sodium carbonate and potassium carbonate.

Example of the rust-preventing agents include acid sulfite, sodium thiosulfate, ammonium thiodiglycolate, diisopropyl ammonium nitrite, pentaerithritol tetranitrate and dicyclohexyl ammonium nitrite.

Examples of the antioxidants include phenol antioxidants (including hindered phenol antioxidants), amine antioxidants, sulfur antioxidants, and phosphorus antioxidants.

Examples of the phenol antioxidants (including hindered phenol antioxidants) include butylated hydroxy anisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-methyl-6-tert-butylphenol), 4,4'-butylidenebis(3-methyl-6-tert-butylphenol), 3,9-bis[2-[3-(3-tert-butyl-4-hydroxy-5-methylphenyl)propyonyloxy]-1,1-dimethyl ethyl]-2,4,8,10-tetraixaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxy benzyl)benzene, and tetrakis[methylene-3-(3',5'-di-tert-butyl-4'-hydroxy phenyl)propionate]methane.

Exampled of the amine antioxidants include phenyl-β-naphthyl amine, α-naphthyl amine, N,N'-di-sec-butyl-p-phenylene diamine, phenothiazine, N,N'-diphenyl-p-phenylene diamine, 2,6-di-tert-butyl-p-cresol, 2,6-di-tert-butylphenol, 2,4-dimethyl-6-tert-butyl-phenol, butylhydroxy anisole, 2,2'-methylene-bis(4-methyl-6-tert-butylphenol), 4,4'-butylidene-bis(3-methyl-6-tert-butylphenol), 4,4'-thiobis(3-methyl-6-tert-butylphenol), tetrakis[methylene-3 (3,5-di-tert-butyl-4-dihydroxyphenyl)propionate]methane, and 1,1,3-tris(2-methyl-4-hydroxy-5-tert-butylphenyl)butane.

Examples of the sulfur antioxidants include dilauryl 3,3'-thiodipropionate, distearyl thiodipropionate, laurylstearyl thiodipropionate, dimyristyl 3,3'-thiodipropionate, distearyl-β,β'-thiodipropionate, 2-mercaputo benzoimidazole, and dilauryl sulfide.

Examples of the phosphorus antioxidants include triphenyl phosphite, octadecyl phosphite, triisodecyl phosphite, trilauryl trithio phosphite, and trinonyl phenyl phosphite.

Examples of the ultraviolet absorbing agents include benzophenone ultraviolet absorbing agents, benzotriazole ultraviolet absorbing agents, salicylate ultraviolet absorbing agents, cyanoacrylate ultraviolet absorbing agents, and nickel complex salt ultraviolet absorbing agents.

Examples of the bezophenone ultraviolet absorbing agents include 2-hydroxy-4-n-octoxy benzophene, 2-hydroxy-4-n-dodecyl oxybenzophenone, 2,4-dihydroxy benzophenone, 2-hydroxy-4-methoxybenzophenone, and 2,2',4,4'-tetrahydroxybenzophenone.

Examples of the benzothiazole ultraviolet absorbing agents include 2-(2'-hydroxy-5'-tert-octylphenyl)benzotriazole, 2-(2'-hydroxy-5'-methyl phenyl)benzoriazole, 2-(2'-hydroxy-4'-octoxyphenyl)benzotriazole, and 2-(2'-hydroxy-3'-tert-butyl-5'-methyl phenyl)-5-chlorobenzotriazole.

Examples of the salicylate ultraviolet absorbing agents include phenyl salicylate, p-tert-butylphenyl salicylate, and p-octylphenyl salicylate.

Examples of the cyanoacrylate ultraviolet absorbing agents include ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate.

Examples of the nickel complex salt ultraviolet absorbing agents include nickelbis(octylphenyl)sulfide, 2,2'-thiobis(4-tert-octylphalate)-n-butylamine nickel (II), 2,2'-thiobis(4-tert-octylphalate)-2-ethylhyxyl amine nickel (II), and 2,2'-thiobis(4-tert-octylphalate)triethanol amine nickel (II).

The solid content of the ink of the present invention mainly include a water-insoluble coloring material and fine resin particles.

The ink used in the present invention has a viscosity at 25° C. of 6 mPa·s to 15 mPa·s, and more preferably 6.5 mPa·s to 12 mPa·s. When the viscosity is more than 15 mPa·s, the ejection stability may be difficult to be secured.

The ink used in the present invention has a pH of 7 to 10.

The ink used in the present invention can be applied to various recording by the inkjet recording system, for example, particularly suitably applied to inkjet recording printers, facsimile apparatuses, copiers, printer/fax/copier complex machines, and so forth.

In particular, the ink used in the present invention can be preferably used in an inkjet recording apparatus having two or more ink ejection heads (inkjet head). That is, four ink ejection heads, in which a black ink and color inks of three colors, for example, cyan, magenta, yellow are respectively introduced, are arranged in this order along a main scanning direction. In the outward direction, the color inks attach onto a recording medium after the black ink attaches thereon, for example, in the order of black, cyan, magenta and yellow, and in the inward direction, the black ink attaches onto the recording medium after the color inks attach thereon, for example, in the order of yellow, magenta, cyan and black.

The ink used in the present invention is contained in a container and used as an ink cartridge. The container is not particularly limited and its shape, structure, size, and material can be suitably selected in accordance with the intended use. Preferred examples thereof include those having at least an ink pouch formed by aluminum laminated film or resin film.

Such ink cartridge can be used by detachably attaching to various inkjet recording apparatuses.

Generally, an inkjet recording method includes an ink jetting step, and further includes a stimulus generating step, and a control step as necessary. The ink jetting step is a step of applying a stimulus to a recording ink so as to jet the recording ink, thereby forming an image. The inkjet unit is not particularly limited, and examples thereof include various nozzles for ink ejection. The nozzle diameter is preferably 30 µm or less, and particularly preferably 1 µm to 20 µm.

The surface of the ink ejection head is preferably treated with water-repellent coating, and in particular silicone coating or fluorine coating is preferable.

Such a constitution is also preferable that a sub-tank for supplying ink is provided on the inkjet head and the ink is supplied to the sub-tank via a supply tube from the ink cartridge.

A stimulus generated in the stimulus generating step is not particularly limited and may be suitably selected in accordance with the intended use. Examples thereof include heat (temperature), pressure, vibration, and light. These may be used alone or in combination. Among these, heat and pressure are preferably used.

Examples of the stimulus generating unit includes heating devices, pressure devices, piezoelectric elements, vibration generating devices, ultrasonic generators and lighting devices. Specific examples include piezoelectric actuators such as piezoelectric elements, thermal actuators using electrothermal conversion elements such as exothermic resistors to cause film boiling and, accordingly, phase change of a liquid, shape-memory alloy actuators using metal phase changes due to temperature changes, and electrostatic actuators using electrostatic force.

The aspect of the recording ink jetting is not particularly limited and varies depending on the type of the stimulus. For example, when the stimulus is "heat," thermal energy corresponding to recording signals is applied to the recording ink in the recording head, for example, using a thermal head, the thermal energy causes the recording ink to bubble, and the bubble pressure urges the recording ink to be jetted as ink droplets from the nozzle hole of the recording head. When the stimulus is "pressure," for example, an electric voltage is applied to a piezoelectric element bonded at a position called a pressure chamber within the ink passage of the recording head, the piezoelectric element is bent and the pressure chamber is reduced in volume, thereby the ink is jetted as droplets from the nozzle hole of the recording head.

The recording ink droplets to be jetted preferably have a particle size of approximately 3 pl to 40 pl and a resolution of 300 dpi or more, and is preferably jetted at a jetting speed of 5 m/sec to 20 m/sec, and a driving frequency of 1 kHz or more.

Advantageous Effects of Invention

The present invention provides an inkjet recording inkset which enables to print with less color difference in bidirectional printing and with high image density in a printing method for forming a black image by superimposing a color ink droplet and a black ink droplet, and an inkjet recording method using the inkjet recording inkset.

EXAMPLES

Hereinafter, the present invention will be specifically explained with reference to Examples and Comparative Examples. However, Examples are not to be construed as limiting the invention in any way. Note that "%" in Preparation examples and Production Examples means "% by mass" except of an average particle diameter (D50%).

Preparation Example 1

A Surface-Treated Carbon Black Pigment Dispersion Liquid

Into 3,000 mL of 2.5 N sodium sulfate solution, 90 g of carbon black (SEAST #9, manufactured by Tokai Carbon Co., Ltd.) having a nitrogen adsorption specific surface area of 142 $m^2$/g, and a DBP oil absorption of 115 mL/100 g was added, then the mixture was stirred at a temperature of 60° C. and a speed of 300 rpm and subjected to reaction for 10 h, thereby oxidizing the carbon black. This reaction solution was filtrated, then the carbon black which had been filtrated out was neutralized with a sodium hydroxide solution and subjected to ultrafiltration. The carbon black obtained was washed with water and dried, then dispersed into purified water such that its amount was 20% by mass.

Preparation Example 2

Preparation of a Diazo Compound-Treated Carbon Black Dispersion

A carbon black (#960 manufactured by Mitsubishi Chemical Corporation) having a nitrogen adsorption specific surface area of 260 $m^2$/g, and a DBP oil absorption of 69 mL/100 g (100 g), 34 g of p-amino-N-benzoic acid, and 750 g of water were mixed and dispersed. In the mixture, 16 g of nitric acid was dripped and stirred at 70° C. Five minutes later, a solution obtained by dispersing 11 g of sodium nitrite in 50 g of water was added in the mixture, and then further stirred for 1 hour. The slurry obtained was diluted tenfold and centrifuged to remove coarse particles. The pH value was then adjusted with diethanolamine to pH 8 to pH 9 and then desalting and concentration were performed by ultrafiltration to obtain a carbon black dispersion with a pigment concentration of 15%. The carbon black dispersion obtained was filtrated with a polypropylene filter having an average pore size of 0.5 μm so as to obtain a carbon black dispersion. The average particle diameter (D50%) of the obtained carbon black dispersion measured with a particle size distribution meter (MICROTRAC UPA, manufactured by Nikkiso Co.) was 99 nm.

Synthesis Example 1

Preparation of Polymer Dispersion Solution

Inside of a 1 L flask equipped with a mechanical stirrer, a thermometer, a nitrogen gas introducing tube, a reflux pipe, and a dropping funnel was sufficiently purged with nitrogen. Then, 11.2 g of styrene, 2.8 g of acrylic acid, 12.0 g of lauryl methacrylate, 4.0 g of polyethylene glycol methacrylate, 4.0 g of styrene macromer (trade name: AS-6, manufactured by To a Gosei Kabushiki Kaisha), and 0.4 g of mercaptoethanol were charged into the flask, and the temperature thereof was raised to 65° C.

Then, a mixed solution containing 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (trade name: AS-6, manufactured by To a Gosei Kabushiki Kaisha), 3.6 g of mercaptoethanol, 2.4 g of azobisdimethyl valeronitrile and 18 g of methyl ethyl ketone was dripped into the flask for 2.5 h.

Upon completion of dropwise addition, a mixed solution of 0.8 g of azobisdimethyl valeronitrile and 18 g of methyl ethyl ketone was dripped into the flask for 0.5 h, matured for 1 h at a temperature of 65° C., and then 0.8 g of azobisdimethyl valeronitrile was added and further matured for 1 h.

Upon completion of reaction, 364 g of methyl ethyl ketone was added to the flask, and 800 g of a polymer solution with a concentration of 50% was obtained.

Preparation Example 3

Preparation of Fine Polymer Particle Dispersion Containing Phthalocyanine Pigment The polymer solution produced in Synthesis Example 1 (28 g), 26 g of C. I. Pigment Blue 15:3 (pigment), 13.6 g of 1 mol/L potassium hydroxide solution, 20 g of methyl ethyl ketone and 30 g of ion-exchanged water were sufficiently stirred, and then kneaded using a three-roll mill.

The paste obtained was put into 200 g of ion-exchanged water, and the solution was sufficiently stirred; thereafter, the methyl ethyl ketone and the water were removed by distillation using an evaporator, thereby obtaining a cyan fine polymer particle dispersion.

Preparation Example 4

Preparation of Fine Polymer Particle Dispersion Containing Dimethyl Quinacridone Pigment A magenta fine polymer particle dispersion was obtained in the same manner as in Synthesis Example 1, except that the pigment used in Preparation Example 3 was changed to Pigment Red 122.

Preparation Example 5

Preparation of Fine Polymer Particle Dispersion Containing Monoazo Yellow Pigment A yellow fine polymer particle dispersion was obtained in the same manner as in Synthesis Example 1, except that the pigment used in Preparation Example 3 was changed to Pigment Yellow 74.

Preparation Example 6

Preparation of Phthalocyanine Pigment Dispersion

C. I. Pigment Blue 15:3 (150 g), 120 g of the compound expressed by Chemical Formula 4, i.e. polyoxyethylene (n=40) β-naphthyl ether, were premixed, and circulated and dispersed using a disc-type bead mill (Model KDL, manufactured by Shinmaru Enterprises Corporation; zirconia balls having a diameter of 0.3 mm used as media), to thereby obtain a pigment dispersion.

Preparation Example 7

Preparation of Dimethyl Quinacridone Pigment Dispersion

C. I. Pigment Red 122 (150 g), 100 g of the compound expressed by Chemical Formula 4, i.e. polyoxyethylene (n=40) β-naphthyl ether, were premixed and circulated and dispersed using a disc-type bead mill (Model KDL, manufactured by Shinmaru Enterprises Corporation; zirconia balls having a diameter of 0.3 mm used as media), to thereby obtain a pigment dispersion.

Preparation example 8

Preparation of Monoazo Yellow Pigment Dispersion

C. I. Pigment Yellow 74 (150 g), 100 g of the compound expressed by Chemical Formula 4, i.e. polyoxyethylene (n=40) β-naphthyl ether, were premixed and circulated and dispersed using a disc-type bead mill (Model KDL, manufactured by Shinmaru Enterprises Corporation; zirconia balls having a diameter of 0.3 mm used as media), to thereby obtain a pigment dispersion.

Production Example 1

Production of Black Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

| <Ink Composition> | |
|---|---|
| the pigment dispersion produced in Preparation Example 1 | 8.0% (as a solid content) |
| glycerin | 16.0% |
| 1,3-butane diol | 16.0% |
| 2-ethyl-1,3-hexanediol | 1.0% |
| nonionic surfactant (SOFTANOL EP7025 manufactured by NIPPON SHOKUBAI CO., LTD) | 1.0% |
| ion-exchanged water | 58.0% |

Production Example 2

Production of Cyan Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

| <Ink Composition> | |
|---|---|
| the pigment dispersion produced in Preparation Example 3 | 6.0% (as a solid content) |
| glycerin | 12.0% |
| 1,3-butane diol | 24.0% |
| 2-ethyl-1,3-hexanediol | 1.0% |
| fluorine surfactant (Chemical Formula 1: $R1 = SO_3$, $R2 = NH_4$, $Rf = CF_3$, $q = 6$) | 1.0% |
| ion-exchanged water | 56.0% |

Production Example 3

Production of Magenta Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

| <Ink Composition> | |
|---|---|
| the pigment dispersion produced in Preparation Example 4 | 6.0% (as a solid content) |
| glycerin | 12.0% |
| 1,3-butane diol | 24.0% |
| 2-ethyl-1,3-hexanediol | 1.0% |
| fluorine surfactant (Chemical Formula 1: $R1 = SO_3$, $R2 = NH_4$, $Rf = CF_3$, $q = 6$) | 1.0% |
| ion-exchanged water | 56.0% |

Production Example 4

Production of Yellow Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

| <Ink Composition> | |
|---|---|
| the pigment dispersion produced in Preparation Example 5 | 5.0% (as a solid content) |
| glycerin | 12.0% |
| 1,3-butane diol | 24.0% |
| 2-ethyl-1,3-hexanediol | 1.0% |
| fluorine surfactant (Chemical Formula 1: $R1 = SO_3$, $R2 = NH_4$, $Rf = CF_3$, $q = 6$) | 1.0% |
| ion-exchanged water | 57.0% |

Production Example 5

Production of Black Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

| <Ink Composition> | |
|---|---|
| the pigment dispersion produced in Preparation Example 1 | 8.0% (as a solid content) |
| glycerin | 16.0% |
| 1,3-butane diol | 16.0% |
| fluorine surfactant (Chemical Formula 2: $n = 4$, $m = 10$, $p = 4$, $Rf = CF_2CF_3$) | 1.0% |
| ion-exchanged water | 59.0% |

Production Example 6

Production of Cyan Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 3 | 6.0% (as a solid content) |
| glycerin | 12.0% |
| 1,3-butane diol | 24.0% |
| fluorine surfactant (Chemical Formula 1: $R_1 = SO_3$, $R_2 = NH_4$, $R_f = CF_3$, $q = 6$) | 1.0% |
| ion-exchanged water | 57.0% |

Production Example 7

Production of Magenta Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 4 | 6.0% (as a solid content) |
| glycerin | 12.0% |
| 1,3-butane diol | 24.0% |
| fluorine surfactant (Chemical Formula 1: $R_1 = SO_3$, $R_2 = NH_4$, $R_f = CF_3$, $q = 6$) | 1.0% |
| ion-exchanged water | 57.0% |

Production Example 8

Production of Yellow Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 5 | 5.0% (as a solid content) |
| glycerin | 12.0% |
| 1,3-butane diol | 24.0% |
| fluorine surfactant (Chemical Formula 1: $R_1 = SO_3$, $R_2 = NH_4$, $R_f = CF_3$, $q = 6$) | 1.0% |
| ion-exchanged water | 58.0% |

Production Example 9

Production of Black Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 1 | 8.0% (as a solid content) |
| glycerin | 16.0% |
| 3-methyl-1,3-butane diol | 16.0% |
| fluorine surfactant (Chemical Formula 3: $m = 2$, $n = 10$) | 1.0% |
| ion-exchanged water | 59.0% |

Production Example 10

Production of Black Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 1 | 8.0% (as a solid content) |
| glycerin | 16.0% |
| 1,3-butane diol | 16.0% |
| nonionic surfactant (SOFTANOL EP7025 manufactured by NIPPON SHOKUBAI CO., LTD) | 1.0% |
| ion-exchanged water | 59.0% |

Production Example 11

Production of Cyan Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 6 | 6.0% (as a solid content) |
| glycerin | 12.0% |
| 1,3-butane diol | 24.0% |
| fluorine surfactant (Chemical Formula 1: $R_1 = SO_3$, $R_2 = NH_4$, $R_f = CF_3$, $q = 6$) | 1.0% |
| ion-exchanged water | 57.0% |

Production Example 12

Production of Magenta Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 7 | 6.0% (as a solid content) |
| glycerin | 12.0% |
| 1,3-butane diol | 24.0% |
| fluorine surfactant (Chemical Formula 1: R1 = SO$_3$, R2 = NH$_4$, Rf = CF$_3$, q = 6) | 1.0% |
| ion-exchanged water | 57.0% |

Production Example 13

Production of Yellow Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 8 | 5.0% (as a solid content) |
| glycerin | 12.0% |
| 1,3-butane diol | 24.0% |
| fluorine surfactant (Chemical Formula 1: R1 = SO$_3$, R2 = NH$_4$, Rf = CF$_3$, q = 6) | 1.0% |
| ion-exchanged water | 58.0% |

Production Example 14

Production of Black Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 1 | 8.0% (as a solid content) |
| acrylic resin emulsion (AQUABRID 4720 manufactured by DAICEL CHEMICAL INDUSTRIES, LTD.) | 3.0% (as a solid content) |
| glycerin | 14.0% |
| 3-methyl-1,3-butane diol | 14.0% |
| fluorine surfactant (Chemical Formula 2: n = 4, m = 10, p = 4, Rf = CF$_2$CF$_3$) | 1.0% |
| ion-exchanged water | 60.0% |

Production Example 15

Production of Cyan Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 6 | 6.0% (as a solid content) |
| acrylic resin emulsion (AQUABRID 4720 manufactured by DAICEL CHEMICAL INDUSTRIES, LTD.) | 3.0% (as a solid content) |
| glycerin | 10.0% |
| 1,3-butane diol | 20.0% |
| fluorine surfactant (Chemical Formula 1: R1 = SO$_3$, R2 = NH$_4$, Rf = CF$_3$, q = 6) | 1.0% |
| ion-exchanged water | 60.0% |

Production Example 16

Production of Magenta Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 7 | 6.0% (as a solid content) |
| acrylic resin emulsion (AQUABRID 4720 manufactured by DAICEL CHEMICAL INDUSTRIES, LTD.) | 3.0% (as a solid content) |
| glycerin | 10.0% |
| 1,3-butane diol | 20.0% |
| fluorine surfactant (Chemical Formula 1: R1 = SO$_3$, R2 = NH$_4$, Rf = CF$_3$, q = 6) | 1.0% |
| ion-exchanged water | 60.0% |

Production Example 17

Production of Yellow Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 8 | 5.0% (as a solid content) |
| acrylic resin emulsion (AQUABRID 4720 manufactured by DAICEL CHEMICAL INDUSTRIES, LTD.) | 3.0% (as a solid content) |
| glycerin | 10.0% |
| 1,3-butane diol | 20.0% |
| fluorine surfactant (Chemical Formula 1: R1 = SO$_3$, R2 = NH$_4$, Rf = CF$_3$, q = 6) | 1.0% |
| ion-exchanged water | 61.0% |

Production Example 18

Production of Black Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

| <Ink Composition> | |
| --- | --- |
| the pigment dispersion produced in Preparation Example 1 | 8.0% (as a solid content) |
| glycerin | 14.0% |
| 3-methyl-1,3-butane diol | 14.0% |
| fluorine surfactant (Chemical Formula 3: m = 2, n = 10) | 1.0% |
| ion-exchanged water | 63.0% |

Production Example 19

Production of Cyan Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

| <Ink Composition> | |
| --- | --- |
| the pigment dispersion produced in Preparation Example 6 | 6.0% (as a solid content) |
| glycerin | 10.0% |
| 1,3-butane diol | 20.0% |
| fluorine surfactant (Chemical Formula 1: R1 = $SO_3$, R2 = $NH_4$, Rf = $CF_3$, q = 6) | 1.0% |
| ion-exchanged water | 63.0% |

Production Example 20

Production of Magenta Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

| <Ink Composition> | |
| --- | --- |
| the pigment dispersion produced in Preparation Example 7 | 6.0% (as a solid content) |
| glycerin | 10.0% |
| 1,3-butane diol | 20.0% |
| fluorine surfactant (Chemical Formula 1: R1 = $SO_3$, R2 = $NH_4$, Rf = $CF_3$, q = 6) | 1.0% |
| ion-exchanged water | 63.0% |

Production Example 21

Production of Yellow Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

| <Ink Composition> | |
| --- | --- |
| the pigment dispersion produced in Preparation Example 8 | 5.0% (as a solid content) |
| glycerin | 10.0% |
| 1,3-butane diol | 20.0% |
| fluorine surfactant (Chemical Formula 1: R1 = $SO_3$, R2 = $NH_4$, Rf = $CF_3$, q = 6) | 1.0% |
| ion-exchanged water | 64.0% |

Production Example 22

Production of Black Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

| <Ink Composition> | |
| --- | --- |
| the pigment dispersion produced in Preparation Example 2 | 8.0% (as a solid content) |
| glycerin | 16.0% |
| 1,3-butane diol | 16.0% |
| nonionic surfactant (SOFTANOL EP7025 manufactured by NIPPON SHOKUBAI CO., LTD) | 1.0% |
| ion-exchanged water | 59.0% |

Production Example 23

Production of Cyan Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

| <Ink Composition> | |
| --- | --- |
| the pigment dispersion produced in Preparation Example 6 | 6.0% (as a solid content) |
| glycerin | 10.0% |
| triethylene glycol | 20.0% |
| fluorine surfactant (Chemical Formula 1: R1 = $SO_3$, R2 = $NH_4$, Rf = $CF_3$, q = 6) | 1.0% |
| ion-exchanged water | 63.0% |

Production Example 24

Production of Magenta Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 7 | 6.0% (as a solid content) |
| glycerin | 10.0% |
| triethylene glycol | 20.0% |
| fluorine surfactant (Chemical Formula 1: $R1 = SO_3$, $R2 = NH_4$, $Rf = CF_3$, $q = 6$) | 1.0% |
| ion-exchanged water | 63.0% |

Production Example 25

Production of Yellow Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 8 | 5.0% (as a solid content) |
| glycerin | 10.0% |
| triethylene glycol | 20.0% |
| fluorine surfactant (Chemical Formula 1: $R1 = SO_3$, $R2 = NH_4$, $Rf = CF_3$, $q = 6$) | 1.0% |
| ion-exchanged water | 64.0% |

Production Example 26

Production of Black Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 1 | 8.0% (as a solid content) |
| glycerin | 16.0% |
| triethylene glycol | 16.0% |
| fluorine surfactant (Chemical Formula 1: $R1 = SO_3$, $R2 = NH_4$, $Rf = CF_3$, $q = 6$) | 1.0% |
| ion-exchanged water | 59.0% |

Production Example 27

Production of Cyan Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 3 | 6.0% (as a solid content) |
| glycerin | 12.0% |
| 1,3-butane diol | 24.0% |
| fluorine surfactant (Chemical Formula 2: $n = 4$, $m = 10$, $p = 4$, $Rf = CF_2CF_3$) | 1.0% |
| ion-exchanged water | 57.0% |

Production Example 28

Production of Magenta Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 4 | 6.0% (as a solid content) |
| glycerin | 12.0% |
| 1,3-butane diol | 24.0% |
| fluorine surfactant (Chemical Formula 2: $n = 4$, $m = 10$, $p = 4$, $Rf = CF_2CF_3$) | 1.0% |
| ion-exchanged water | 57.0% |

Production Example 29

Production of Yellow Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

<Ink Composition>

| | |
|---|---|
| the pigment dispersion produced in Preparation Example 5 | 5.0% (as a solid content) |
| glycerin | 12.0% |
| 1,3-butane diol | 24.0% |
| fluorine surfactant (Chemical Formula 2: $n = 4$, $m = 10$, $p = 4$, $Rf = CF_2CF_3$) | 1.0% |
| ion-exchanged water | 58.0% |

Production Example 30

Production of Cyan Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

| <Ink Composition> | |
|---|---|
| the pigment dispersion produced in Preparation Example 3 | 6.0% (as a solid content) |
| glycerin | 12.0% |
| 1,3-butane diol | 24.0% |
| nonionic surfactant (SOFTANOL EP7025 manufactured by NIPPON SHOKUBAI CO., LTD) | 1.0% |
| ion-exchanged water | 57.0% |

Production Example 31

Production of Magenta Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

| <Ink Composition> | |
|---|---|
| the pigment dispersion produced in Preparation Example 4 | 6.0% (as a solid content) |
| glycerin | 12.0% |
| 1,3-butane diol | 24.0% |
| nonionic surfactant (SOFTANOL EP7025 manufactured by NIPPON SHOKUBAI CO., LTD) | 1.0% |
| ion-exchanged water | 57.0% |

Production Example 32

Production of Yellow Pigment Ink

An ink composition of the following formulation was prepared, and a 10% aqueous lithium hydroxide solution was added thereto such that the pH value of the ink composition solution was adjusted to 9. Then, the ink composition solution was filtrated through a membrane filter having an average pore size of 0.8 μm to thereby prepare a recording ink.

| <Ink Composition> | |
|---|---|
| the pigment dispersion produced in Preparation Example 5 | 5.0% (as a solid content) |
| glycerin | 12.0% |
| 1,3-butane diol | 24.0% |
| nonionic surfactant (SOFTANOL EP7025 manufactured by NIPPON SHOKUBAI CO., LTD) | 1.0% |
| ion-exchanged water | 58.0% |

The properties of the thus produced inks were respectively measured and evaluated as follows.

<Viscosity>

The ink viscosity was measured at a temperature of 25° C. using an R-500 viscometer (TOKI SANGYO CO., LTD.) under the conditions of 1°34'×R24 cone rotor, 60 rpm and 3 minutes later.

<Dynamic Surface Tension>

The dynamic surface tension of the ink was measured at a temperature of 25° C. using BP-2 (manufactured by Kruss GmbH) and the value measured after 100 ms from the beginning of the measurement was read.

<Storage Stability>

Each of the produced ink (50 g) was loaded in a poly bottle (a square bottle of polyethylene), and stored at a temperature of 65° C. for a month. Then the degree of increase in viscosity and aggregation (%) were evaluated on the basis of the following evaluation criteria. The degree of increase in viscosity and aggregation were respectively calculated by the following equation:

$$[(\text{Viscosity after stored at } 65° \text{C. for 1 month})] - (\text{Initial viscosity})/(\text{Initial viscosity}) \times 100$$

$$[(\text{Particle diameter after stored at } 65° \text{C. for 1 month})] - (\text{Initial particle diameter})/(\text{Initial particle diameter}) \times 100$$

Note that the average particle diameter in the equation is an average particle diameter (D50%) measured in such a manner that the ink is diluted 800-fold with water and measured using a particle size distribution measuring device (MICROTRAC UPA, manufactured by Nikkiso Co., Ltd.).

[Evaluation Criteria]

A: Increase in viscosity and aggregation were not observed.

B: 2% or less of increase in viscosity and aggregation were observed.

C: 5% or less of increase in viscosity and aggregation were observed.

D: More than 5% of increase in viscosity and aggregation were observed.

Examples 1 to 8 and Comparative Examples 1 to 3

The black ink and each of the color ink were combined as shown in Tables 1-1 to 4-2 to produce inksets of Examples and Comparative Examples, and the inksets were evaluated as follows.

The results are shown in Tables 1-1 to 4-2.

<Black Image Density>

By the use of an inkjet printer (IPSIO GX5000 manufactured by Ricoh Company, Ltd.), in which four recording heads in which inks of black (K), cyan (C), magenta (M), yellow (Y) were respectively introduced, were arranged in this order along a main scanning direction, a composite black image was printed in a ink droplet volume of 10 pL at a resolution of 600 dpi by superimposing color ink droplets, which were one half of black ink droplets in number (50% duty). An image density of the outward direction and that of the inward direction were measured. In this case, in the outward direction the inks of black (K), cyan (C), magenta (M) and yellow (Y) were attached in this order onto a recording medium and in the inward direction inks of yellow (Y), magenta (M), cyan (C) and black (K) were attached in this order onto the recording medium.

<Bidirectional Color Difference>

The color difference between the measured image density of the outward direction and that of the inward direction was obtained, and then the bidirectional color difference was evaluated on the basis of the following evaluation criteria.
[Evaluation Criteria]
A: Color difference was less than 0.05.
B: Color difference was 0.05 or more to less than 0.1.
C: Color difference was 0.1 or more.
<Color Bleeding>
Each recording ink was filled in the inkjet printer which was used in measurement of <Black Image Density>, and each recording ink of black, cyan, magenta and yellow was combined to form inksets as shown in Tables 1-1 to 4-2, and recording was performed on My paper (manufactured by NBS Ricoh Co., Ltd.) using each of the inksets.

The bleeding in the boundary between the black ink and the color ink in each of obtained images was visually observed.
[Evaluation Criteria]
A: No bleeding was observed in the boundary between the black ink and the color ink and an image was highly sharp.
B: Bleeding was hardly observed in the boundary between the black ink and the color ink and an image was sharp.
C: Slight bleeding was observed in the boundary between the black ink and the color ink and image was slightly inferior in sharpness.
D: Serious bleeding was observed in the boundary between the black ink and the color ink and an image was not sharp.

<Defoaming Property>
At a temperature of 25° C., 5 ml of each ink produced was poured in a test tube having an inner diameter of 10 mm and an entire length of 160 mm, and the test tube was shaken up and down 30 times for 10 seconds and left to stand. Then, 5 minutes later, foam height was evaluated on the basis of the following criteria.
[Evaluation Criteria]
A: Foam height was less than 3 cm.
B: Foam height was 3 cm or more and less than 6 cm.
C: Foam height was 6 cm or more.
<Ejection Stability>
Each recording ink of black, cyan, magenta and yellow was combined to form inksets as shown in Tables 1-1 to 4-2. By using each inkset, printing was performed continuously on 200 sheets of paper at a resolution of 600 dpi, and then the ejection disturbance and ejection failure were evaluated on the basis of the following criteria.
[Evaluation Criteria]
A: No ejection disturbance and ejection failure were observed at all.
B: Disturbance and ejection failure were observed in 5 nozzles or less.
C: Disturbance and ejection failure were observed in 10 nozzles or less.
D: Disturbance and ejection failure were observed in 11 nozzles or more.

TABLE 1-1

| | Example 1 | | | | Example 2 | | | | Example 3 | | | |
| --- | --- | --- | --- | --- | --- | --- | --- | --- | --- | --- | --- | --- |
| | Produc. Ex. 1 | Produc. Ex. 2 | Produc. Ex. 3 | Produc. Ex. 4 | Produc. Ex. 5 | Produc. Ex. 6 | Produc. Ex. 7 | Produc. Ex. 8 | Produc. Ex. 9 | Produc. Ex. 6 | Produc. Ex. 7 | Produc. Ex. 8 |
| Pigment dispersion liquid of Production Example 1 | 8 | | | | 8 | | | | 8 | | | |
| Pigment dispersion liquid of Production Example 2 | | | | | | | | | | | | |
| Pigment dispersion liquid of Production Example 3 | | 6 | | | | 6 | | | | 6 | | |
| Pigment dispersion liquid of Production Example 4 | | | 6 | | | | 6 | | | | 6 | |
| Pigment dispersion liquid of Production Example 5 | | | | 5 | | | | 5 | | | | 5 |
| Pigment dispersion liquid of Production Example 6 | | | | | | | | | | | | |
| Pigment dispersion liquid of Production Example 7 | | | | | | | | | | | | |
| Pigment dispersion liquid of Production Example 8 | | | | | | | | | | | | |
| acrylic resin emulsion | | | | | | | | | | | | |
| glycerin | 16 | 12 | 12 | 12 | 16 | 12 | 12 | 12 | 16 | 12 | 12 | 12 |
| triethylene glycol | | | | | | | | | | | | |
| 1,5-pentane diol | | | | | | | | | | | | |
| 1,3-butane diol | 16 | 24 | 24 | 24 | | 24 | 24 | 24 | | 24 | 24 | 24 |
| propylene glycol | | | | | | | | | | | | |
| 3-methyl-1,3-butane diol | | | | | 16 | | | | 16 | | | |
| 2-methyl-2,4-pentane diol | | | | | | | | | | | | |
| 2-ethyl-1,3-hexanediol | 1 | 1 | 1 | 1 | | | | | | | | |
| nonionic surfactant | 1 | | | | | | | | | | | |
| fluorine surfactant expressed by Chemical Formula 1 | | 1 | 1 | 1 | | 1 | 1 | 1 | | 1 | 1 | 1 |
| fluorine surfactant expressed by Chemical Formula 2 | | | | | 1 | | | | | | | |
| fluorine surfactant expressed by Chemical Formula 3 | | | | | | | | | 1 | | | |
| subtotal | 42 | 44 | 44 | 43 | 41 | 43 | 43 | 42 | 41 | 43 | 43 | 42 |
| water | 58 | 56 | 56 | 57 | 59 | 57 | 57 | 58 | 59 | 57 | 57 | 58 |
| total | 100 | 100 | 100 | 100 | 100 | 100 | 100 | 100 | 100 | 100 | 100 | 100 |

TABLE 1-2

|  | Example 1 | | | | Example 2 | | | | Example 3 | | | |
| --- | --- | --- | --- | --- | --- | --- | --- | --- | --- | --- | --- | --- |
|  | Produc. Ex. 1 | Produc. Ex. 2 | Produc. Ex. 3 | Produc. Ex. 4 | Produc. Ex. 5 | Produc. Ex. 6 | Produc. Ex. 7 | Produc. Ex. 8 | Produc. Ex. 9 | Produc. Ex. 6 | Produc. Ex. 7 | Produc. Ex. 8 |
| viscosity mPa·s | 7.4 | 7.2 | 7.6 | 7.1 | 8.2 | 8.1 | 8.4 | 7.9 | 8 | 8.1 | 8.4 | 7.9 |
| dynamic surface tension mN/m | 35 | 28 | 28 | 28 | 27 | 28 | 28 | 28 | 27 | 28 | 28 | 28 |
| storage stability | A | A | A | A | A | A | A | A | A | A | A | A |
| black image density (outward) |  | 1.28 | | | | 1.30 | | | | 1.32 | | |
| black image density (homeward) |  | 1.23 | | | | 1.28 | | | | 1.28 | | |
| bidirectional color difference |  | B | | | | A | | | | A | | |
| color bleeding |  | A | | | | A | | | | A | | |
| deforming property | A | A | A | A | A | A | A | A | B | A | A | A |
| ejection stability | A | A | A | A | A | A | A | A | A | A | A | A |

Note:
Produc. Ex. means Production Example.

TABLE 2-1

|  | Example 4 | | | | Example 5 | | | | Example 6 | | | |
| --- | --- | --- | --- | --- | --- | --- | --- | --- | --- | --- | --- | --- |
|  | Produc. Ex. 10 | Produc. Ex. 11 | Produc. Ex. 12 | Produc. Ex. 13 | Produc. Ex. 14 | Produc. Ex. 15 | Produc. Ex. 16 | Produc. Ex. 17 | Produc. Ex. 18 | Produc. Ex. 19 | Produc. Ex. 20 | Produc. Ex. 21 |
| Pigment dispersion liquid of Production Example 1 | 8 | | | | 8 | | | | 8 | | | |
| Pigment dispersion liquid of Production Example 2 |  | | | | | | | | | | | |
| Pigment dispersion liquid of Production Example 3 |  | | | | | | | | | | | |
| Pigment dispersion liquid of Production Example 4 |  | | | | | | | | | | | |
| Pigment dispersion liquid of Production Example 5 |  | | | | | | | | | | | |
| Pigment dispersion liquid of Production Example 6 |  | 6 | | | | 6 | | | | 6 | | |
| Pigment dispersion liquid of Production Example 7 |  | | 6 | | | | 6 | | | | 6 | |
| Pigment dispersion liquid of Production Example 8 |  | | | 5 | | | | 5 | | | | 5 |
| acrylic resin emulsion |  | | | | 3 | 3 | 3 | 3 | | | | |
| glycerin | 16 | 12 | 12 | 12 | 14 | 10 | 10 | 10 | 14 | 10 | 10 | 10 |
| triethylene glycol |  | | | | | | | | | | | |
| 1,5-pentane diol |  | | | | | | | | | | | |
| 1,3-butane diol | 16 | 24 | 24 | 24 | | 20 | 20 | 20 | | 20 | 20 | 20 |
| propylene glycol |  | | | | | | | | | | | |
| 3-methyl-1,3-butane diol |  | | | | 14 | | | | 14 | | | |
| 2-methyl-2,4-pentane diol |  | | | | | | | | | | | |
| 2-ethyl-1,3-hexanediol |  | | | | | | | | | | | |
| nonionic surfactant | 1 | | | | | | | | | | | |
| fluorine surfactant expressed by Chemical Formula 1 |  | 1 | 1 | 1 | | 1 | 1 | 1 | | 1 | 1 | 1 |
| fluorine surfactant expressed by Chemical Formula 2 |  | | | | 1 | | | | | | | |
| fluorine surfactant expressed by Chemical Formula 3 |  | | | | | | | | 1 | | | |
| subtotal | 41 | 43 | 43 | 42 | 40 | 40 | 40 | 39 | 37 | 37 | 37 | 36 |
| water | 59 | 57 | 57 | 58 | 60 | 60 | 60 | 61 | 63 | 63 | 63 | 64 |
| total | 100 | 100 | 100 | 100 | 100 | 100 | 100 | 100 | 100 | 100 | 100 | 100 |

TABLE 2-2

|  | Example 4 | | | | Example 5 | | | | Example 6 | | | |
| --- | --- | --- | --- | --- | --- | --- | --- | --- | --- | --- | --- | --- |
|  | Produc. Ex. 10 | Produc. Ex. 11 | Produc. Ex. 12 | Produc. Ex. 13 | Produc. Ex. 14 | Produc. Ex. 15 | Produc. Ex. 16 | Produc. Ex. 17 | Produc. Ex. 18 | Produc. Ex. 19 | Produc. Ex. 20 | Produc. Ex. 21 |
| viscosity mPa·s | 7.4 | 7.0 | 7.6 | 7.0 | 8.2 | 7.8 | 8 | 7.8 | 7.2 | 7.0 | 7.1 | 7.0 |
| dynamic surface tension mN/m | 35 | 28 | 28 | 28 | 28 | 28 | 28 | 28 | 27 | 28 | 28 | 28 |

TABLE 2-2-continued

|  | Example 4 | | | | Example 5 | | | | Example 6 | | | |
| --- | --- | --- | --- | --- | --- | --- | --- | --- | --- | --- | --- | --- |
|  | Produc. Ex. 10 | Produc. Ex. 11 | Produc. Ex. 12 | Produc. Ex. 13 | Produc. Ex. 14 | Produc. Ex. 15 | Produc. Ex. 16 | Produc. Ex. 17 | Produc. Ex. 18 | Produc. Ex. 19 | Produc. Ex. 20 | Produc. Ex. 21 |
| storage stability | A | A | A | A | A | A | A | A | A | A | A | A |
| black image density (outward) |  | 1.30 |  |  |  | 1.30 |  |  |  | 1.28 |  |  |
| black image density (homeward) |  | 1.24 |  |  |  | 1.28 |  |  |  | 1.24 |  |  |
| bidirectional color difference |  | B |  |  |  | A |  |  |  | A |  |  |
| color bleeding |  | A |  |  |  | A |  |  |  | A |  |  |
| deforming property | A | A | A | A | A | A | A | A | B | A | A | A |
| ejection stability | A | A | A | A | A | A | A | A | A | A | A | A |

Note:
Produc. Ex. means Production Example.

TABLE 3-1

|  | Example 7 | | | | Example 8 | | | |
| --- | --- | --- | --- | --- | --- | --- | --- | --- |
|  | Produc. Ex. 22 | Produc. Ex. 23 | Produc. Ex. 24 | Produc. Ex. 25 | Produc. Ex. 14 | Produc. Ex. 2 | Produc. Ex. 3 | Produc. Ex. 4 |
| Pigment dispersion liquid of Production Example 1 |  |  |  |  | 8 |  |  |  |
| Pigment dispersion liquid of Production Example 2 | 8 |  |  |  |  |  |  |  |
| Pigment dispersion liquid of Production Example 3 |  |  |  |  |  | 6 |  |  |
| Pigment dispersion liquid of Production Example 4 |  |  |  |  |  |  | 6 |  |
| Pigment dispersion liquid of Production Example 5 |  |  |  |  |  |  |  | 5 |
| Pigment dispersion liquid of Production Example 6 |  | 6 |  |  |  |  |  |  |
| Pigment dispersion liquid of Production Example 7 |  |  | 6 |  |  |  |  |  |
| Pigment dispersion liquid of Production Example 8 |  |  |  | 5 |  |  |  |  |
| acrylic resin emulsion |  |  |  |  | 3 |  |  |  |
| glycerin | 16 | 10 | 10 | 10 | 14 | 12 | 12 | 12 |
| triethylene glycol |  | 20 | 20 | 20 |  |  |  |  |
| 1,5-pentane diol |  |  |  |  |  |  |  |  |
| 1,3-butane diol | 16 |  |  |  |  | 24 | 24 | 24 |
| propylene glycol |  |  |  |  |  |  |  |  |
| 3-methyl-1,3-butane diol |  |  |  |  | 14 |  |  |  |
| 2-methyl-2,4-pentane diol |  |  |  |  |  |  |  |  |
| 2-ethyl-1,3-hexanediol |  |  |  |  |  | 1 | 1 | 1 |
| nonionic surfactant | 1 |  |  |  |  |  |  |  |
| fluorine surfactant expressed by Chemical Formula 1 |  | 1 | 1 | 1 |  | 1 | 1 | 1 |
| fluorine surfactant expressed by Chemical Formula 2 |  |  |  |  | 1 |  |  |  |
| fluorine surfactant expressed by Chemical Formula 3 |  |  |  |  |  |  |  |  |
| subtotal | 41 | 37 | 37 | 36 | 40 | 44 | 44 | 43 |
| water | 59 | 63 | 63 | 64 | 60 | 56 | 56 | 57 |
| total | 100 | 100 | 100 | 100 | 100 | 100 | 100 | 100 |

Note:
Produc. Ex. means Production Example.

TABLE 3-2

|  | Example 7 | | | | Example 8 | | | |
| --- | --- | --- | --- | --- | --- | --- | --- | --- |
|  | Production Example 22 | Production Example 23 | Production Example 24 | Production Example 25 | Production Example 14 | Production Example 2 | Production Example 3 | Production Example 4 |
| viscosity mPa·s | 7.6 | 6.8 | 7 | 6.8 | 8.2 | 7.2 | 7.6 | 7.1 |
| dynamic surface tension mN/m | 34 | 28 | 28 | 28 | 28 | 28 | 28 | 28 |
| storage stability | A | A | A | A | A | A | A | A |
| black image density (outward) |  | 1.27 |  |  |  | 1.30 |  |  |
| black image density (homeward) |  | 1.20 |  |  |  | 1.28 |  |  |
| bidirectional color difference |  | B |  |  |  | A |  |  |
| color bleeding |  | A |  |  |  | A |  |  |
| deforming property | A | A | A | A | A | A | A | A |
| ejection stability | A | A | A | A | A | A | A | A |

TABLE 4-1

|  | Comparative Example 1 | | | | Comparative Example 2 | | | | Comparative Example 3 | | | |
| --- | --- | --- | --- | --- | --- | --- | --- | --- | --- | --- | --- | --- |
|  | Produc. Ex. 26 | Produc Ex. 27 | Produc Ex. 28 | Produc. Ex. 29 | Produc. Ex. 5 | Produc. Ex. 27 | Produc. Ex. 28 | Produc. Ex. 29 | Produc. Ex. 10 | Produc. Ex. 30 | Produc. Ex. 31 | Produc. Ex. 32 |
| Pigment dispersion liquid of Production Example 1 | 8 | | | | 8 | | | | 8 | | | |
| Pigment dispersion liquid of Production Example 2 | | | | | | | | | | | | |
| Pigment dispersion liquid of Production Example 3 | | 6 | | | | 6 | | | | 6 | | |
| Pigment dispersion liquid of Production Example 4 | | | 6 | | | | 6 | | | | 6 | |
| Pigment dispersion liquid of Production Example 5 | | | | 5 | | | | 5 | | | | 5 |
| Pigment dispersion liquid of Production Example 6 | | | | | | | | | | | | |
| Pigment dispersion liquid of Production Example 7 | | | | | | | | | | | | |
| Pigment dispersion liquid of Production Example 8 | | | | | | | | | | | | |
| acrylic resin emulsion | | | | | | | | | | | | |
| glycerin | 16 | 12 | 12 | 12 | 16 | 12 | 12 | 12 | 16 | 12 | 12 | 12 |
| triethylene glycol | | | | | | | | | | | | |
| 1,5-pentane diol | | | | | | | | | | | | |
| 1,3-butane diol | 16 | 24 | 24 | 24 | | 24 | 24 | 24 | 16 | 24 | 24 | 24 |
| propylene glycol | | | | | | | | | | | | |
| 3-methyl-1,3-butane diol | | | | | 16 | | | | | | | |
| 2-methyl-2,4-pentane diol | | | | | | | | | | | | |
| 2-ethyl-1,3-hexanediol | | | | | | | | | | | | |
| nonionic surfactant | | | | | | | | | | 1 | 1 | 1 | 1 |
| fluorine surfactant expressed by Chemical Formula 1 | 1 | | | | | | | | | | | |
| fluorine surfactant expressed by Chemical Formula 2 | | 1 | 1 | 1 | 1 | 1 | 1 | 1 | | | | |
| fluorine surfactant expressed by Chemical Formula 3 | | | | | | | | | | | | |
| subtotal | 41 | 43 | 43 | 42 | 41 | 43 | 43 | 42 | 41 | 43 | 43 | 42 |
| water | 59 | 57 | 57 | 58 | 59 | 57 | 57 | 58 | 59 | 57 | 57 | 58 |
| total | 100 | 100 | 100 | 100 | 100 | 100 | 100 | 100 | 100 | 100 | 100 | 100 |

TABLE 4-2

|  | Comparative Example 1 | | | | Comparative Example 2 | | | | Comparative Example 3 | | | |
| --- | --- | --- | --- | --- | --- | --- | --- | --- | --- | --- | --- | --- |
|  | Produc. Ex. 26 | Produc. Ex. 27 | Produc. Ex. 28 | Produc. Ex. 29 | Produc. Ex. 5 | Produc. Ex. 27 | Produc. Ex. 28 | Produc. Ex. 29 | Produc. Ex. 10 | Produc. Ex. 30 | Produc. Ex. 31 | Produc. Ex. 32 |
| viscosity mPa·s | 8.2 | 8.1 | 8.6 | 8.3 | 8.2 | 8.1 | 8.6 | 8.3 | 7.4 | 7.2 | 7.6 | 7.2 |
| dynamic surface tension mN/m | 27 | 26 | 26 | 26 | 27 | 26 | 26 | 26 | 35 | 36 | 36 | 36 |
| storage stability | C | C | C | C | A | C | C | C | A | A | A | A |
| black image density (outward) | | | 1.30 | | | | 1.30 | | | | 1.25 | |
| black image density (homeward) | | | 1.15 | | | | 1.20 | | | | 1.12 | |
| bidirectional color difference | | | C | | | | C | | | | C | |
| color bleeding | | | C | | | | B | | | | C | |
| deforming property | B | B | B | B | A | B | B | B | A | A | A | A |
| ejection stability | C | C | C | C | A | C | C | C | A | A | A | A |

Note:
Produc. Ex. means Production Example.

As can be seen from Tables 1-1 to 4-2, in Examples 2, 5 and 8, by the use of the fluorine surfactant expressed by Chemical Formula 2 in the black pigment ink, the bidirectional color difference was 0.02, exhibiting the most excellent effect. In Examples 3 and 6, by the use of the fluorine surfactant expressed by Chemical Formula 3, the bidirectional color difference was 0.04, and in Examples 1, 4 and 7, by the use of the nonionic surfactant the bidirectional color difference was 0.05 to 0.07.

In contrast, in Comparative Examples 1 to 3, in which the fluorine surfactant expressed by Chemical Formula 1 was not used in a color ink, even though in Comparative Example 2 wherein the fluorine surfactant expressed by Chemical Formula 2 which was most preferable for the black pigment ink was used, the bidirectional color difference could not be obtained with satisfaction.

The Production Example 26 used in Comparative Example 1 and Production Example 8 in Patent Literature 3 were similar in composition, but the results of storage stability differed. This is because the condition of the present invention, "stored at 65° C. for 1 month" was stricter than the condition of the storage stability in Patent Literature 3, "stored at 50° C. for 3 weeks". That is, the fluorine surfactant expressed by Chemical Formula 1 may increase in viscosity and undergo aggregation to the water-dispersible carbon black having a hydrophilic group on its surface which can be dispersed without using a dispersing agent, in the strict environment estimated in the present invention.

The invention claimed is:

1. An inkjet recording inkset comprising:
a black ink; and
at least one color ink,
wherein the black ink and the color ink each comprise a coloring material, water, a water-soluble organic solvent and a surfactant, and
wherein the black ink comprises, as the coloring material, a water-dispersible carbon black having a hydrophilic group on a surface of the carbon black, which can be dispersed without a dispersing agent,
wherein only the black ink comprises, as the surfactant, a fluorine surfactant expressed by Chemical Formula 2:

Chemical Formula 2

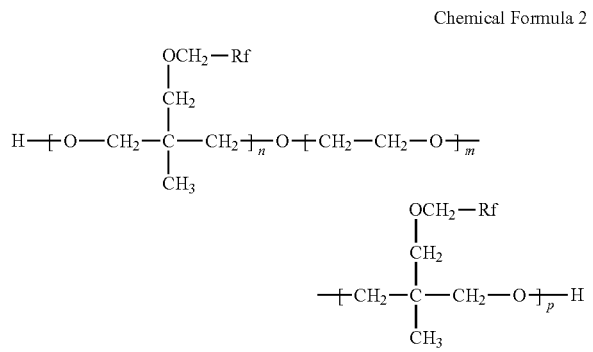

wherein Rf represents a fluorine-containing alkyl group, and
n, m, and p each represent an integer of 0 or more;
and only the color ink comprises, as the surfactant, a fluorine surfactant expressed by Chemical Formula 1:

Chemical Formula 1

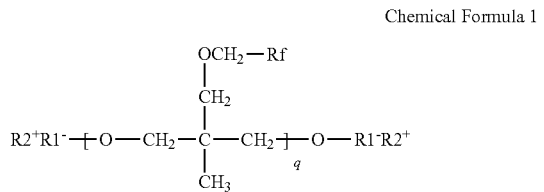

wherein Rf represents a fluorine-containing alkyl group,
R1 represents an anionic group,
R2 represents a cationic group, and
q represents a positive integer.

2. The inkjet recording inkset according to claim 1, wherein the Rf in the Chemical Formula 1 has 3 or less carbon atoms.

3. The inkjet recording inkset according to claim 2, wherein the Rf in the Chemical Formula 1 is one group selected from the group consisting of —$CF_3$, —$CF_2CF_3$, and —$C_3F_7$.

4. The inkjet recording inkset according to claim 1, wherein the R1 in the Chemical Formula 1 is —$SO_3$ or —$PO_3$.

5. The inkjet recording inkset according to claim 1, wherein R2 in the Chemical Formula 1 is one group selected from the group consisting of —$NH_4$, Na, K and Li.

6. The inkjet recording inkset according to claim 1, wherein the q in the Chemical Formula 1 is 1 to 6.

7. The inkjet recording inkset according to claim 1, wherein the color ink comprises a pigment as the coloring material.

8. The inkjet recording inkset according to claim 7, wherein the pigment is dispersed by a compound expressed by Chemical Formula 4:

Chemical Formula 4

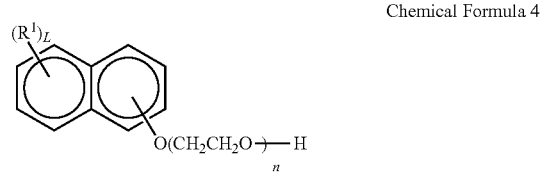

wherein $R^1$ represents one group selected from the group consisting of an alkyl group having 1 to 20 carbon atoms, an allyl group, and an aralkyl group,
L represents an integer of 0 to 7, and
n represents an integer of 20 to 200.

9. The inkjet recording inkset according to claim 8, wherein the n in the Chemical Formula 4 represents an integer of 30 to 50.

10. The inkjet recording inkset according to claim 1, wherein the Rf in the Chemical Formula 2 has 3 or less carbon atoms.

11. The inkjet recording inkset according to claim 10, wherein the Rf in the Chemical Formula 2 represents one group selected from the group consisting of —$CF_3$, —$CF_2CF_3$, and —$C_3F_7$.

12. The inkjet recording inkset according to claim 1, wherein the n, m and p in the Chemical Formula 2 respectively represent 0 to 4, 0 to 20, and 0 to 4.

13. The inkjet recording inkset according to claim 1, wherein the black ink further comprises a resin emulsion.

14. An inkjet recording method comprising:
superimposing a droplet of a black ink and a droplet of at least one color ink so as to form a black image in bidirectional printing by an inkjet recording apparatus having two or more ink ejection heads,
wherein an inkjet recording inkset is employed, and
wherein the inkjet recording inkset comprises:
a black ink, and
at least one color ink,
wherein the black ink and the color ink each comprise a coloring material, water, a water-soluble organic solvent and a surfactant, and
wherein the black ink comprises, as the coloring material, a water-dispersible carbon black having a hydrophilic group on a surface of the carbon black, which can be dispersed without a dispersing agent, wherein only the black ink comprises, as the surfactant, a fluorine surfactant expressed by Chemical Formula 2:

Chemical Formula 2

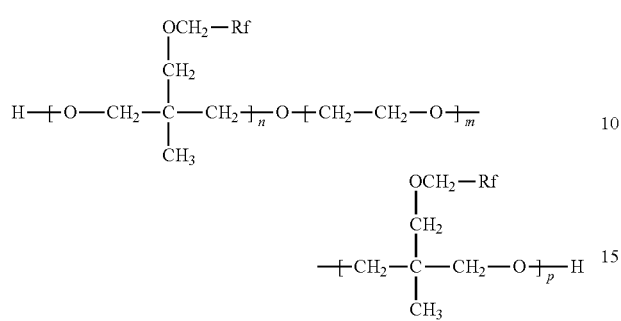

wherein Rf represents a fluorine-containing alkyl group, and n, m, and p each represent an integer of 0 or more;

and only the color ink comprises, as the surfactant, a fluorine surfactant expressed by Chemical Formula 1:

Chemical Formula 1

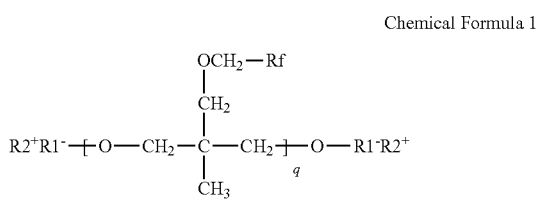

wherein Rf represents a fluorine-containing alkyl group,
R1 represents an anionic group,
R2 represents a cationic group, and
q represents a positive integer.

* * * * *